United States Patent [19]

Gaffal et al.

[11] Patent Number: 4,643,593
[45] Date of Patent: Feb. 17, 1987

[54] ASSEMBLY FOR LUBRICATING THRUST BEARINGS OF MACHINES

[75] Inventors: Karl Gaffal, Freinsheim; Frank Etzold, Frankenthal, both of Fed. Rep. of Germany

[73] Assignee: Klein, Schanzlin & Becker Aktiengesellschaft, Frankenthal, Fed. Rep. of Germany

[21] Appl. No.: 845,175

[22] Filed: Mar. 27, 1986

[30] Foreign Application Priority Data

Apr. 2, 1985 [DE] Fed. Rep. of Germany ....... 3512027

[51] Int. Cl.4 .......................... F16C 33/10; F16C 33/66
[52] U.S. Cl. ..................................... 384/371; 384/404; 384/414; 384/462
[58] Field of Search ................ 384/322, 462, 368–371, 384/397, 400, 403, 404, 414, 471, 472, 473, 476; 184/6.11

[56] References Cited

U.S. PATENT DOCUMENTS 3,148,006 9/1964 Lynn .................................... 384/404
4,448,552 5/1984 White et al. ........................ 384/404

FOREIGN PATENT DOCUMENTS 1053252 10/1956 Fed. Rep. of Germany ...... 384/400
3203642 8/1983 Fed. Rep. of Germany .
3319537 11/1984 Fed. Rep. of Germany .
241841 4/1969 U.S.S.R. ............................ 384/471

Primary Examiner—Stuart S. Levy
Assistant Examiner—Thomas R. Hannon
Attorney, Agent, or Firm—Peter K. Kontler

[57] ABSTRACT

The rotor of a thrust bearing for the horizontal shaft of a centrifugal pump is installed in a housing which is mounted in an oil-containing vessel and has an inlet below and an outlet above the oil level. The peripheral surface of the rotor has a groove which receives a portion of an annular stator to form a suction channel which draws oil from the vessel through the inlet when the shaft is driven. The oil fills the housing and is returned into the supply of oil in the vessel by way of the outlet, a cooling unit and a filtering cartridge.

18 Claims, 4 Drawing Figures

ASSEMBLY FOR LUBRICATING THRUST BEARINGS OF MACHINES

BACKGROUND OF THE INVENTION

The invention relates to lubricated bearings in general, and more particularly to improvements in lubricated bearing assemblies for use in large centrifugal pumps, valves and many other types of machines. Still more particularly, the invention relates to improvements in bearing assemblies of the type wherein a substantially horizontal shaft carries and drives the rotor of a thrust bearing and the rotor is installed in a housing which receives oil or another liquid lubricant from a lubricant-containing vessel in response to rotation of the shaft.

German Pat. No. 32 03 642 discloses a bearing assembly wherein the luricant-containing vessel is a component part of a cooling unit which is mounted at a level below the rotor of the thrust bearing. A drawback of the patented assembly is that the lubricant in the vessel exchanges heat with a continuously circulated stream of a cooling medium so that the temperature of the lubricant drops below a minimum acceptable value when the machine is idle, i.e., when the lubricant does not receive heat from the rotary parts of the machine. Therefore, such bearing assemblies must be provided with heating units and with complex regulating systems which start the heating units when the temperature of the continuously cooled lubricant drops below the acceptable value. The heating units occupy substantial amounts of space and consume energy to thus increase the operating cost of the patented bearing assemblies.

German Offenlegungsschrift No. 33 19 537 discloses a lubricating system for a shaft bearing which is or is likely to be subjected to pronounced thermal stresses. The housing for the thrust bearing is mounted in and is cooled by the contents of an oil tank. That end portion of the shaft which extends into the housing carries an impeller which draws oil from the tank into the housing when the shaft is driven. The housing is spaced apart from the bottom of the tank so as to provide room for an oil sump. A drawback of this proposal is that the impeller is a separately produced part which occupies space in and thus necessitates the use of a larger housing.

A similar bearing assembly is disclosed in Brochure AT 476/82 ("Glacier Designers' Handbook No. 11") which is published by the firm Glacier, Alperton, Wembley, Middlesex, United Kingdom. A disc-shaped rotor of the thrust bearing is confined in a housing and is mounted at one end of the shaft. The housing is installed in the upper portion of an oil tank and its lower part has two openings which establish communication with the tank and enable a portion of the rotor to dip into the supply of oil so that oil is drawn into the housing and lubricates the thrust bearing when the shaft is set in motion. The peripheral surface of the rotor is surrounded by a ring which is movably mounted in the housing and whose lower portion has two axially parallel channels each of which communicates with two bores extending substantially tangentially of the rotor. One bore serves to admit oil into the respective channel and the other bore discharges oil from the channel. The oil film between the rotor and the ring turns the ring, either clockwise or counterclockwise, and the bores allow for circulation of oil through the respective channels. The ring changes its angular position in response to a change in the direction of rotation of the rotor to thus change the direction of flow of circulated oil. A drawback of this proposal is that the bearing assembly is prone to malfunction in response to penetration of contaminants and/or other foreign objects. The foreign objects can block angular movements of the ring to thus render the lubricating system imperative.

OBJECTS AND SUMMARY OF THE INVENTION

An object of the invention is to provide a bearing assembly wherein the lubricant can be stored, circulated, cooled and (if necessary) filtered with a small number of moving parts and external conduits so as to reduce the bulk, initial cost and maintenance cost of the bearing assembly and to reduce the likelihood of uncontrolled escape of lubricant.

Another object of the invention is to provide a bearing assembly which can be used with advantage in hot or cold climates and whose energy requirements are low.

A further object of the invention is to provide a bearing assembly which need not be equipped with any means for monitoring the temperature of the lubricant.

An additional object of the invention is to provide a novel and improved method of lubricating the radial and/or thrust bearing or bearings of a centrifugal pump.

Still another object of the invention is to provide a machine which embodies the improved bearing assembly.

A further object of the invention is to provide a novel and improved automatically lubricated thrust bearing.

Another object of the invention is to provide a novel and improved system for circulating a stream of lubricant from an oil sump, through at least one shaft bearing and back into the sump.

The invention is embodied in a bearing assembly for use in centrifugal pumps and other types of machines. The improved bearing assembly comprises a vessel (e.g., a cylindrical oil tank) for a supply of lubricant which partially fills the vessel to a predetermined level, a substantially horizontal driven shaft which extends through an opening of the vessel above the level of lubricant and has an end portion in the vessel, and a housing which is disposed in the vessel, which spacedly surrounds the end portion of the shaft and which has an inlet below and an outlet above the level of lubricant in the vessel. The bearing assembly further comprises a thrust bearing including a substantially disc-shaped rotor provided on the end portion of the shaft in the housing and an annular stator having an internal surface defining with the peripheral surface of the rotor an annular suction channel which communicates with the inlet to draw lubricant from the vessel in response to rotation of the shaft with the rotor whereby the inflowing lubricant fills the housing and the subsequently drawn flow of lubricant returns into the vessel by way of the outlet. The channel can include a portion of a groove in the peripheral surface of the rotor. The rotor and/or the stator can be assembled of two or more arcuate sections to allow for confinement of the rotor within the stator.

The flow of lubricant from the vessel, by way of the inlet and into the housing can be enhanced by roughening the peripheral surface of the rotor and/or the internal surface of the stator, by providing at least one of these surfaces with one or more annuli of teeth, by providing at least one of these surfaces with flutes and- /or by providing at least one of these surfaces with one or more vanes or blades.

At least a portion of the channel can be inclined with reference to a plane which is normal to the axis of the shaft. The internal surface of the stator can be provided with at least one elongated recess which is disposed in a substantially vertical plane.

The bearing assembly can further comprise a lubricant cooling unit which is installed in the vessel above the level of the supply of lubricant. The cooling unit has lubricant admitting means in communication with the outlet of the housing and means for discharging cooled lubricant in the interior of the vessel. The cooling unit further comprises means (e.g., a suitable heat exchanger operating with water as the heat exchange medium) for withdrawing heat from lubricant between the admitting and discharging means. The heat withdrawing means includes means for circulating a fluid coolant along a path extending through the vessel above the level of the supply of lubricant. The cooling unit is or can be disposed between an upright end wall (e.g., a detachable door or cover) of the vessel and an end wall of the preferably cylindrical housing. The bearing assembly can further comprise means for filtering the lubricant prior to reentry into the supply of lubricant in the vessel. Such filtering means can comprise a cartridge which receives cooled lubricant from a pipe of the discharing means.

The vessel can be connected with or can comprise means defining a chamber for one or more radial shaft bearings. The chamber surrounds the shaft outside of the vessel and receives lubricant from the housing (preferably by way of the opening in the vessel). The bearing assembly then further comprises means for conveying lubricant from the chamber into the vessel.

The bearing assembly can further comprise means for heating the lubricant in the vessel (e.g., in a cold climate and when the rotor of the thrust bearing is idle for an extended period of time).

The preferably disc- or wheel-shaped rotor can be provided with at least one passage which extends between the two end faces of the rotor and one end of which is nearer to the rotor axis than the other end. The one end of the passage is provided in that end face of the rotor which faces the shaft, and the aforementioned chamber and faces away from the outlet of the housing. The passage conveys lubricant in a direction from its first toward its second end as soon as the shaft is set in motion.

The novel features which are considered as characteristic of the invention are set forth in particular in the appended claims. The improved bearing assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
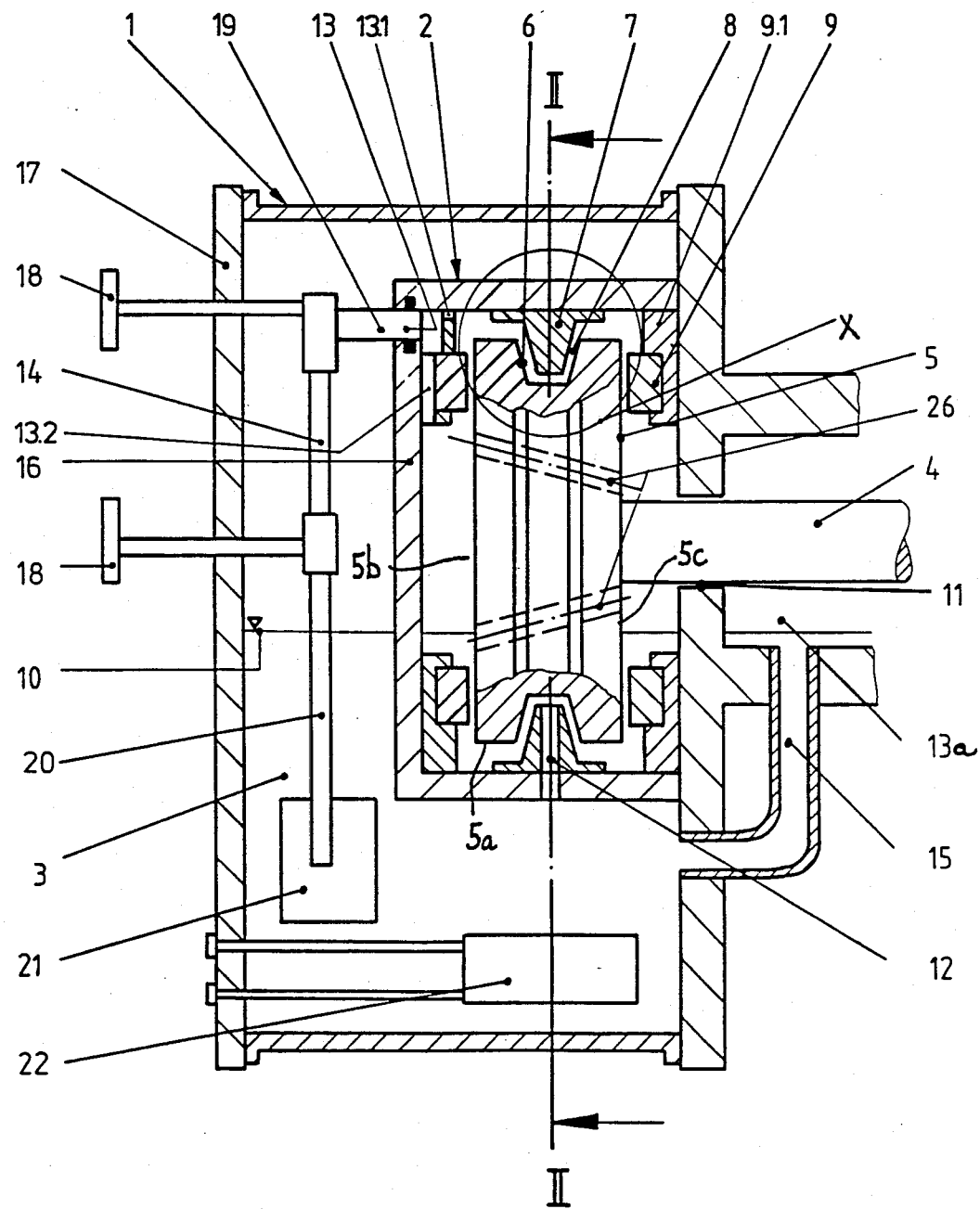
FIG. 1 is a substantially axial sectional view of a bearing assembly embodying the invention.

FIG. 1 shows a vessel 1 (hereinafter called tank) which contains a supply 3 of oil or another liquid lubricant filling its interior to the level 10. The tank 1 is a horizontal cylinder with an upright end wall 17 in the form of a removable cover or door which is spaced apart from an upright end wall 16 of a short horizontal cylindrical housing 2. The latter is installed in the interior of the talk 1 in such a way that the major portion of its internal space is located above the level 10. This results in an enlargement of the space for the oil sump (supply 3).

A horizontal driven shaft 4 extends from the exterior of the tank 1, through an opening 11 in the right-hand end wall of the tank and into the housing 2 wherein its end portion carries a disc-shaped or pulley-shaped rotor 5 forming part of a thrust bearing for the shaft. The peripheral surface 5a of the rotor 5 is formed with a circumferential groove 6 for a portion of a stationary annular stator 7 which is affixed to the housing 2. The parts 5, 7 of the thrust bearing define an annular suction channel 8 which has a substantially U-shaped cross-sectional outline and the lower portion of which is disposed below the level 10 and communicates with the lower portion of the interior of the tank 1 by way of a vertical inlet 12 which is provided in the cylindrical wall of the housing 2 and in the stator 7.

The thrust bearing further comprises stationary ring-shaped bearing elements 9 which flank the rotor 5 and prevent it from moving axially of the shaft 4; the elements 9 ensure that the configuration of the suction channel 8 remains unchanged and that the parts 5,7 of the thrust bearing are not permitted to rub against each other.

The level 10 is located below the lowermost portion of the opening 11 for the shaft 4, i.e., oil which rises into the housing 2 via inlet 12 cannot escape from the housing 2 and tank 1 via opening 11. The level of the upper surface of oil which accumulates in the housing 2 when the shaft 4 does not drive the rotor 5 matches the level 10. This obviates the need for special and/or additional shaft seals.

The axis of the cylindrical housing 2 can be raised to such an extent that the external surface of the cylindrical wall of the housing abuts or is immediately adjacent the topmost portion of the internal surface of the cylindrical wall of the tank 1; this renders it possible to enlarge the oil sump without increasing the overall dimensions of the bearing assembly.

The uppermost portion of the housing 2 has an outlet 13 for evacuation of oil when the housing is filled with oil in response to rotation of the shaft 4 and rotor 5. The dimensions and configuration of the suction channel 8 are selected in such a way that the lower portion of the rotor 5 (such lower portion dips into the body of lubricant in the housing 2 at all times, i.e., even if the shaft 4 is not driven) continuously lifts some oil above the level 10 so that the inlet 12 admits into the housing a more or less continuous stream of oil and the housing is rapidly filled whereupon the oil begins and continues to overflow from the housing via outlet 13 to be returned to the supply 3.

The rate at which the rotor 5 draws oil from the supply 3 via inlet 12 can be influenced in a number of different ways. Thus, the cross-sectional area of the channel 8 can be reduced or increased and/or the channel can be disposed in a plane which is parallel with or inclined relative to the planes of the end faces 5b, 5c of the rotor 5. Thus, the plane of the channel 8 may but need not be normal to the common axis of the shaft 4 and rotor 5.

If the rotor 5 is made of a single piece of a suitable metallic or other material, the annular stator 7 is assembled of two or more arcuate sections (e.g., of two semicircular sections) so as to allow for penetration of a portion of the stator into the circumferential groove 6 in the peripheral surface 5a. It is equally possible to assemble the rotor 5 from two or more arcuate or otherwise configurated sections.

The stationary bearing elements 9 of the thrust bearing are mounted in supports 9.1 one of which is affixed to the right-hand end wall of the tank 1 and the other of which is affixed to the end wall 16 of the housing 2. The left-hand support 9.1 has one or more air evacuating apertures 13.1 and one or more air admitting apertures 13.2. The apertures 13.1 and/or 13.2 can constitute slits or bores which permit for complete evacuation of air from the housing 2 and for reliable cooling of the bearing elements 9.

When the bearing assembly is in use, the pressure of oil in the filled housing 2 is sufficiently high to allow for the flow of a stream of oil through the opening 11 and into a portion or extension 13a of the tank 1. Such extension defines a ring-shaped chamber which surrounds the shaft 4 adjacent to the opening 11 and can receive one or more radial antifriction bearings, not shown (e.g., one or more ball bearings, needle bearings or roller bearings). When the chamber in the extension 13a is filled with oil, the surplus is returned into the lower portion of the tank 1 by way of a bore or a pipe 15.

If the unoccupied portion of the opening 11 constitutes a throttling orifice, the pressure in the chamber of the extension 13a is lower than the pressure of oil in the filled housing 2 so that the machine utilizing the improved bearing assembly need not be provided with any or with any complex and expensive shaft sealing means between the chamber and the atmosphere. It normally suffices to provide a standard labyrinth-type seal which throttles or prevents the flow of oil from the chamber of the extension 13a into the atmosphere.

If the radial bearing or bearings in the extension 13a require simple ring-type lubrication, oil which flows into the chamber via opening 11 suffices for adequate lubrication. If the radial bearing or bearings must be lubricated by pressurized oil, the bearing assembly can be formed with one or more bores (not shown) which admit pressurized oil from the housing 2 into the chamber without any or with minimal throttling.

The stream of heated oil which leaves the housing 2 via outlet 13 is cooled by a cooling unit 14 which is installed in the tank 1 between the end walls 16, 17 above the level 10. The width of the space between the end walls 16, 17 (the housing 2 is not or need not be centered in the tank 1 in the axial direction of the shaft 4) suffices to accommodate a reasonably large cooling unit 14 which cools the stream of heated oil by causing the oil stream to exchange heat with a stream of water or another suitable fluid heat exchange medium. Such medium is caused to flow through the interior of the tank 1 along a path which is disposed above the level 10 and the medium indirectly contacts the stream of heated oil between an oil admitting pipe 19 which is connected to the outlet 13 and a pipe 20 which returns cooled oil into the tank 1. The heat exchange medium is supplied by a source (not shown) by way of a first (upper) conduit 18 and is evacuated from the tank 1 by way of a second (lower) conduit 18. These conduits can be welded to the end wall 17 so as to prevent any leakage of oil and/or heat exchange medium. It will be seen that the conduits 18 pass through the end wall 17 above the level 10. The receiving end of the pipe 19 can be removably plugged into the outlet 13 of the housing 2.

The cooling unit 14 can constitute a commercially available device, e.g., a heat exchanger with a first coil for heated oil and a second coil for the heat exchange medium. Such cooling units occupy little room, i.e., the axial length of the tank 1 need not appreciably exceed the axial length of the housing 2.

An advantage of the feature that the cooling unit 14 is mounted above the level 10 is that the supply 3 of lubricant in the tank 1 is not cooled when the shaft 4 is idle, i.e., that the supply 3 is not cooled when the cooling is unnecessary or undesirable but the cooling unit 4 continues to circulate a stream of heat exchange medium through the upper portion of the interior of the tank 1. The just described mounting of the cooling unit 14 above the level 10 renders it unnecessary to equip the bearing assembly with means for monitoring the condition of the machine and/or the temperature of the supply 3 so as to interrupt the circulation of heat exchange medium when the shaft 4 is arrested and/or when the temperature of the supply 3 drops below a minimum acceptable value.

The conduits 18 can be sufficiently strong and rigid to constitute a means for carrying the cooling unit 14.

Figure 2:
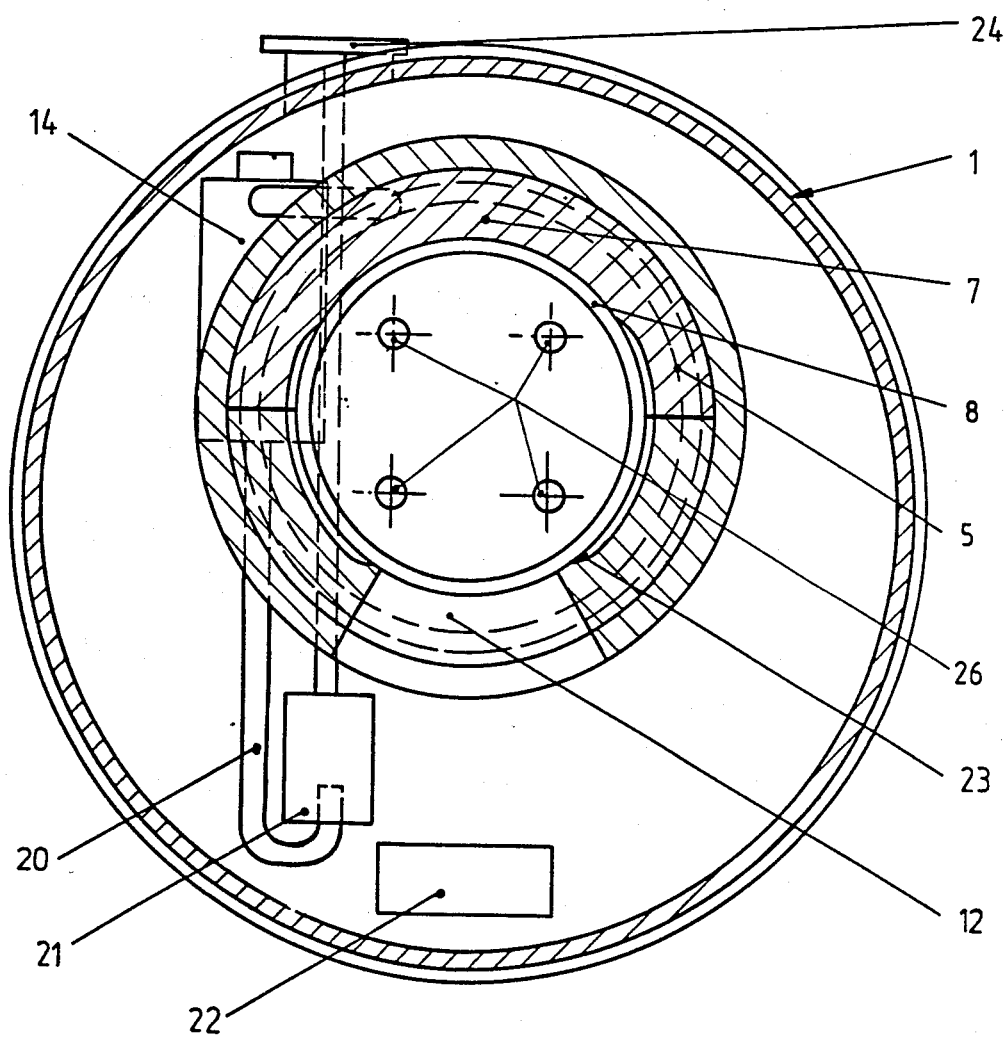
FIG. 2 is a transverse sectional view as seen in the direction of arrows from the line II—II of FIG. 1.

The reference character 21 denotes a filtering element in the form of a cartridge which is attached to the discharge end of the pipe 20 to segregate impurities (e.g., fragments of parts 5, 7, 9 of the thrust bearing) before the cooled oil stream reenters the supply 3 in the lower portion of the tank 1. As can be seen in FIG. 2, the lower portion of the pipe 20 is U-shaped so that the filtering cartridge 21 can be slipped onto or off the free leg of the inverted U. The top portion of the cylindrical wall of the tank 1 has a lid 24 which can be lifted, removed or pivoted to an open position so as to allow for insertion or removal of the cartridge 21. Such insertion or removal of the cartridge 21 can take place while the supply 3 of oil remains in the lower portion of the tank 1 and while the shaft 4 continues to drive the rotor 5. Alternatively, the cartridge 21 or another suitable filtering device can be more or less permanently installed in the tank 1 immediately upstream of the inlet 12. This ensures that oil which is returned from the chamber of the extension 13a via pipe 15 is invariably filtered before it reenters the housing 2.

The provision of an oil heating unit 22 in the lower portion of the tank 1 to heat the supply 3 is desirable and/or necessary if the machine embodying the improved bearing assembly is used in a cold climate, e.g., in polar regions, on offshore oil drilling platforms or for other purposes under circumstances when the temperature of the supply 3 of oil in the tank 1 is likely to drop below the minimum acceptable value, i.e., when the oil cooling action of the tank 1 exceeds the heating action of oil flowing from the filtering cartridge 21 back into the supply 3. The heating unit 22 can constitute a commercially available oil heating device.

The rotor 5 is formed with one or more oil conveying passages 26 which extend between the end faces 5b and 5c. That end of each passage 26 which is provided in the end face 5c is nearer to the axis of the shaft 4 than the other end. This ensures that streams of oil flow from the region of the opening 11 toward that end face (5b) of the rotor 5 which is nearer to the outlet 13 and hence to the cooling unit 14. Each passage 26 can constitute a straight bore whose axis makes with the axis of the shaft 4 a relatively small acute angle. The rotor 5 can be provided with a large number of equidistant passages 26 whose right-hand ends (as viewed in FIG. 1) form a relatively small circle and whose right-hand ends form a larger circle. The difference between the diameters of the two circles determines the rate at which the streams of oil flow from the space adjacent the end face 5c into the space adjacent the end face 5b. This reduces the pressure of oil in the housing 2 adjacent the opening 11. If necessary, adequate lubrication of the radial bearing or bearings in the chamber of the extension 13a can be ensured by providing at least one path for the flow of pressurized oil from one or more selected portions of the housing 2 into the extension 13a, i.e., the radial bearing or bearings are then lubricated by oil flowing through the opening 11 and/or from one or more other portions of the housing 2. Such oil is returned into the lower portion of the tank 1 by way of the pipe 15.

FIG. 2 shows that the internal surface of the annular stator 7 is formed with pockets or recesses 23 in the form of elongated grooves which are disposed in one or more substantially vertical planes at the opposite sides of the common axis of the shaft 4, rotor 5 and stator 7. Each of the recesses can resemble a portion of a spiral to enhance the flow of oil from the region of the inlet 12 toward and into the upper portion of the housing 2 (above the level 10). The illustrated inlet 12 is an elongated slit; however, it is equally possible to provide the housing 2 and the stator 7 with an inlet having one or more bores bounded by cylindrical surfaces.

An advantage of the improved bearing assembly is that the rotor 5 of the thrust bearing for the shaft 4 constitutes the only moving part in the interior of the tank 1. Another important advantage of the bearing assembly is that the quality of lubrication is not influenced by the direction in which the rotor 5 is driven. When the rotor 5 is started and the housing 2 is gradually filled with oil, the aerating opening 13.1 and/or 13.2 and/or the outlet 13 allows for escape of air from the housing before the oil begins to overflow into the pipe 19 and hence into the cooling unit 14. Filling of the housing 2 with oil ensures predictable and reliable lubrication of the thrust bearing as well as of the radial bearing or bearings (if any).

The oil pumping action of the rotor 5 can be regulated with a high degree of accuracy by appropriate roughening of that portion of the peripheral surface of the rotor which bounds the suction channel 8. As mentioned above, such roughening can involve the provision of serrations, flutes, blades or the like. The combined area of those portions of the peripheral surface of the rotor 5 which bound the channel 8 can be increased still further (to thus enhance the oil pumping action of the rotor) by placing the channel 8 into a plane which is not excactly normal to the axis of the shaft 4 and/or by inclining the surfaces bounding the channel in a manner as shown in FIG. 1 (in contrast to the channel of FIG. 3). The provision of one or more recesses 23 also contributes to the pumping action, especially if the recesses have a spiral shape. Such recesses further enhance the suction-induced flow of oil from the supply 3 into and through the inlet 12.

The cooling unit 14 is necessary only if the heat dissipating action of the tnak 1 does not suffice to maintain the temperature of the supply 3 below an unacceptably high value. The tank 1 protects the cooling unit 14, and the latter can be properly connected to the outlet 13 of the housing 2 in a simple and inexpensive way, e.g., by providing the receiving end of the pipe 19 with one or more standard O-rings. Eventual leakage of oil from the outlet 13 directly into the tank 1 (rather than the flow through the cooling unit 14 and filtering cartridge 21) is of no consequence since the oil cooling unit is installed in the tank 1. As mentioned above, the placing of the cooling unit 14 and of the conduits 18 for the heat exchange medium above the level 10 ensures that the unit 14 need not be arrested in response to stoppage of the shaft 4 and rotor 5, and that continued operation of the cooling unit cannot entail an excessive cooling of the supply 3. Thus, intermittent rotation of the shaft 4 is possible even though the bearing assembly is not or need not be provided with means for monitoring the speed of the shaft 4 and/or the temperature of the supply 3. Actual cooling of oil in the unit 14 is interrupted in automatic response to stoppage of the shaft 4 because the rotor 5 ceases to draw oil from the tank 1 via inlet 12 and the level of oil in the housing 2 drops to the level 10 so that the pipe 19 cannot receive oil from the outlet 13. This means that the cooling unit 14 can remain active while the shaft 4 is at a standstill if a continuous operation of the cooling unit is desired or necessary for reasons other than to maintain the temperature of oil within a desired range.

The filtering cartridge 21 constitutes an optional feature of the bearing assembly. It is desirable and advantageous because it can intercept solid particles (such as fragments of the rotor 5, other parts of the thrust bearing and/or parts of the radial bearing or bearings) which could clog the channel 8.

The placing of one or more radial bearings into the chamber of the extension 13a is desirable because such bearing or bearings can be properly lubricated by oil which flows from the housing 2 without it being necessary to employ several external conduits with attendant problems in connection with adequate sealing. As mentioned above, the pipe 15 can be replaced with one or more bores in the extension 13a which is or can be an integral part of the tank 1. The only external conduits (18) which are necessary (if the tank 1 contains an oil cooling unit) can be permanently secured to the end wall 17 and can perform several functions, namely conveying the heat exchange medium and carrying the unit 14. Once they are welded to the end wall 17, the conduits 18 present no problems in connection with sealing.

Figures 3, 4:
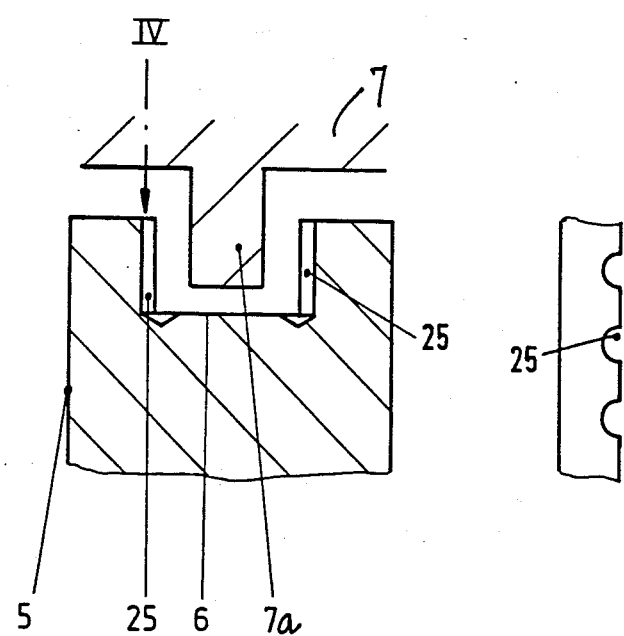
FIG. 3 is an enlarged view of a modification of the detail within the circle X of FIG. 1.
FIG. 4 is a fragmentary developed view of the rotor as seen in the direction of arrow IV in FIG. 3.

FIG. 3 shows portions of a slightly modified rotor 5 and a slightly modified stator 7. That portion (7a) of the stator 7 which extends into the groove 6 of the rotor 5 has a rectangular cross-sectional outline and the channel which is defined by the parts 5, 7 has a U-shaped outline deviating from the outline of the channel 8 which is shown in FIG. 1. Those surfaces of the rotor 5 which flank the portion 7a are provided with flutes 25 bounded by substantially semicylindrical surfaces (see FIG. 4). The flutes 25 can extend substantially radially of the rotor 5. Such flutes enhance the pumping action of the rotor 5 and they can be formed by a milling or drilling tool prior or subsequent to cutting of the groove 6.

The flutes 25 can be utilized in lieu of or in addition to other suitable means for enhancing the flow of oil into the upper portion of the housing 2 in response to rotation of the rotor 5. For example, at least a portion of the peripheral surface of the rotor 5 can be formed with one or more annuli of teeth and/or other types of serrations. Furthermore, the rotor 5 can be provided with one or more vanes or blades which positively pump oil from the inlet 12 toward and into the housing 2 above the level 10.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A bearing assembly for use in pumps and other types of machines, comprising a vessel for a supply of lubricant which fills the vessel to a predetermined level, said vessel having an opening above said level; a substantially horizontal driven shaft extending through said opening and having an end portion in said vessel; a housing disposed in said vessel, spacedly surrounding said end portion and having an inlet below and an outlet above said level; and a thrust bearing comprising a rotor provided on said end portion in said housing and having a peripheral surface, and an annular stator having an internal surface defining with said peripheral surface an annular suction channel which communicates with said inlet to draw lubricant from said vessel in response to rotation of said shaft and said rotor whereby the inflowing lubricant fills said housing and subsequently drawn lubricant returns into said vessel by way of said outlet.

2. The assembly of claim 1, wherein said channel forms part of a groove in said peripheral surface and said channel has a lower portion below said level.

3. The assembly of claim 1, wherein at least one of the parts including said rotor and said stator comprises several arcuate sections.

4. The asembly of claim 1, wherein at least one of said surfaces is roughened.

5. The assembly of claim 1, wherein at least one of said surfaces is toothed.

6. The assembly of claim 1, wherein at least one of said surfaces is fluted.

7. The assembly of claim 1, wherein at least one of said surfaces is bladed.

8. The assembly of claim 1, wherein at least a portion of said channel is inclined with reference to a plane which is normal to the axis of said shaft.

9. The assembly of claim 1, wherein said stator has at least one elongated recess provided in said internal surface and disposed in a substantially vertical plane.

10. The assembly of claim 1, further comprising a lubricant cooling unit installed in said vessel above said level, said cooling unit having lubricant-admitting means communicating with said outlet and means for discharging cooled lubricant in the interior of said vessel.

11. The assembly of claim 10, wherein said cooling unit further comprises means for withdrawing heat from lubricant between said admitting and said discharging means and including means for circulating a fluid coolant along a path extending through said vessel above said level.

12. The assembly of claim 10, wherein said vessel has an end wall and said cooling unit is disposed between said end wall and said housing.

13. The assembly of claim 10, further comprising means for filtering cooled lubricant prior to reentry of such lubricant into the supply of lubricant in said vessel.

14. The assembly of claim 13, wherein said discharging means comprises a pipe and said filtering means comprises a cartridge which receives cooled lubricant from said pipe.

15. The assembly of claim 1, further comprising means defining a chamber surrounding said shaft outside of said vessel and receiving lubricant from said housing, and means for conveying lubricant from said chamber into said vessel.

16. The assembly of claim 1, further comprising means for heating the supply of lubricant in said vessel.

17. The assembly of claim 1, wherein said rotor has spaced-apart first and second end faces and at least one passage having first and second ends in said first and second end faces, respectively, said first end being nearer to the axis of said rotor than said second end.

18. The assembly of claim 17, wherein said first end face faces said shaft and said passage is arranged to convey lubricant in a direction from said first toward said second end face in response to rotation of said shaft.

* * * * *